(12) United States Patent
Frank et al.

(10) Patent No.: US 6,859,430 B1
(45) Date of Patent: Feb. 22, 2005

(54) PROTECTION SWITCHING OF VIRTUAL CONNECTIONS

(75) Inventors: George N. Frank, Dallas, TX (US); Dan Zheng, Plano, TX (US); Michael A. D'Jamoos, Plano, TX (US); Gregory D. Lowe, Dallas, TX (US); Richard McKinney, Southlake, TX (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/410,402

(22) Filed: Oct. 1, 1999

Related U.S. Application Data

(63) Continuation of application No. PCT/US99/01358, filed on Jan. 22, 1999, and a continuation-in-part of application No. 09/026,930, filed on Feb. 20, 1998.

(51) Int. Cl.[7] ................................................. H04L 1/00

(52) U.S. Cl. ......................... 370/216; 370/220; 370/223

(58) Field of Search ................................. 370/216, 217, 370/219, 220, 221, 222, 223, 224, 225, 227, 242, 245, 248, 249, 251, 397, 395.2, 395.31

(56) References Cited

U.S. PATENT DOCUMENTS

| | | | |
|---|---|---|---|
| 4,677,611 A | | 6/1987 | Yanosy, Jr. et al. .......... 370/401 |
| 4,835,763 A | * | 5/1989 | Lau .............................. 370/223 |
| 5,070,498 A | | 12/1991 | Kakuma et al. .............. 370/233 |
| 5,280,475 A | | 1/1994 | Yanagi et al. ................ 370/399 |
| 5,390,164 A | | 2/1995 | Kremer ........................ 370/223 |

(List continued on next page.)

FOREIGN PATENT DOCUMENTS

EP 0818940 1/1998 ........... H04Q/11/14

OTHER PUBLICATIONS

"ATM Service Access Multiplexer (SAM) Generic Requirements", *GR–2842–CORE*, Issue 2, (Nov. 1996).
"ATM Virtual Path Functionality in SONET Rings—Generic Criteria", *Bellcore Standard GR–2837–CORE*, Issue 3, (Oct. 1996).
May, K.P., et al., "A Fast Resortation System for ATM–ring–based LANS", *IEEE Communications Magazine*, 33, 90–98, (Sep. 1995).
Takase, A., et al., "ATM Transport Node for Flexible and Robust Access Networks", *Proceedings of the Global Telecommunications Conference (GLOBECOM)*, vol. 3, Houston, TX, 1481–1487, (Nov. 29–Dec. 2, 1993).
Fritz, J. "Bulletproofing ATM: Part 1", *Byte*, 22, 59–60, (Jun. 1, 1997).

*Primary Examiner*—John Pezzlo
*Assistant Examiner*—Saba Tsegaye
(74) *Attorney, Agent, or Firm*—Fogg and Associates, LLC; Scott V. Lundberg

(57) ABSTRACT

A system and method for protection of virtual connections at the data link layer. The method provides for protection switching in a ring network. The method comprises detecting an error in one of a first and second routes ("the errored route"). Error cells are generated for each virtual connection affected by the detected error. Error cells are transmitted downstream on the errored route. First switch fabric receives the error cells at a downstream network element associated with the errored route. Change in state of the errored route is communicated to a second switch fabric of the downstream network element associated with the other of the first and second routes (the "other route"). When the state of the errored route is worse than the state of the other route, automatically configuring the second switch fabric to establish the other route to be a working route for the virtual connection.

46 Claims, 2 Drawing Sheets

U.S. PATENT DOCUMENTS

| | | | |
|---|---|---|---|
| 5,390,194 A | 2/1995 | Mannle | 714/744 |
| 5,394,389 A | 2/1995 | Kremer | 370/223 |
| 5,515,363 A | 5/1996 | Ben-Nun et al. | 370/232 |
| 5,537,411 A | 7/1996 | Plas | 370/397 |
| 5,557,611 A | 9/1996 | Cappellari et al. | 370/395.43 |
| 5,583,849 A | 12/1996 | Ziemann et al. | 370/397 |
| 5,612,959 A | 3/1997 | Takase et al. | 370/390 |
| 5,636,215 A | 6/1997 | Kubo et al. | 370/397 |
| 5,673,262 A | 9/1997 | Shimizu | 370/395 |
| 5,684,800 A | 11/1997 | Dobbins et al. | 370/401 |
| 5,754,528 A | 5/1998 | Uchida | 370/222 |
| 5,774,662 A | 6/1998 | Sakagawa | 370/395.54 |
| 5,805,820 A | 9/1998 | Bellovin et al. | 709/225 |
| 5,838,663 A | 11/1998 | Elwalid et al. | 370/233 |
| 5,852,606 A | 12/1998 | Prince et al. | 370/395.53 |
| 5,892,912 A | 4/1999 | Suzuki et al. | 370/395.53 |
| 5,912,891 A | 6/1999 | Kanai | 370/395.51 |
| 5,926,102 A * | 7/1999 | Chun et al. | 340/5.3 |
| 5,949,755 A * | 9/1999 | Uphadya et al. | 370/224 |
| 5,974,027 A * | 10/1999 | Chapman | 370/228 |
| 5,978,356 A | 11/1999 | Elwalid et al. | 370/230 |
| 6,072,610 A * | 6/2000 | Kuroyanagi et al. | 398/5 |
| 6,219,336 B1 * | 4/2001 | Takahashi et al. | 370/223 |
| RE37,401 E * | 10/2001 | Yamashita et al. | 714/717 |

* cited by examiner

PROTECTION SWITCHING OF VIRTUAL CONNECTIONS

CROSS REFERENCE TO RELATED APPLICATIONS

This application is a continuation of PCT/US99/01/01358 filed Jan. 22, 1998, and a continuation-in-part of co-pending, commonly assigned application Ser. No. 09/026,930, entitled "SYSTEM AND METHOD FOR PROTECTION SWITCHING OF VIRTUAL CONNECTIONS AT THE DATA LINK LAYER" filed on Feb. 20, 1998 (the '930 Application). The '930 Application is incorporated by reference.

TECHNICAL FIELD

The present invention relates generally to the field of telecommunications and, in particular, to a system and method for protection switching of virtual connections at the data link layer.

BACKGROUND INFORMATION

Telecommunications networks carry various types of information between users, e.g., voice, data, video. A typical telecommunications network includes many components or modules that work together to make a connection between users. For example, a telecommunications network typically includes switches, transport lines, terminals and other conventional equipment used to create connections between users.

Errors can occur in any one of these modules of the network. For example, a fiber optic cable that carries signals for the network can be cut inadvertently or otherwise damaged such that it cannot acceptably carry data. To prevent errors of this nature from hindering communications, networks include redundant components so that when a working component stops functioning acceptably, a replacement or protection component can be switched into the network in place of the working component. Thus, the network is able to continue to carry information despite errors. This is referred to in the industry as network survivability, of which protection switching is an example which uses dedicated protection components.

In recent years, the telecommunications industry has begun developing new networks that carry user traffic over virtual connections in the form of cells or fixed-length packets of data, e.g., asynchronous transfer mode (ATM) networks. Each cell contains a header that includes information as to the destination of the cell or packet. At each network element (NE), the cells are routed through its network modules to the destination endpoint based on the identifiers in the header of the cell. Thus, the same transmission medium can be shared by many contemporaneous connections which span different parts of the network. These cell-based, as opposed to traditional time-slot based, networks introduce new problems into the area of network survivability. The redundant routes in the network may carry traffic for different virtual connections along various portions of the routes. If care is not taken in deciding how to effectuate protection switching for the various virtual connections involved, system capacity and availability could be adversely affected by switching a virtual connection that is, in fact, not affected by the failure.

For the reasons stated above, and for other reasons stated below which will become apparent to those skilled in the art upon reading and understanding the present specification, there is a need in the art for an improved system and method for protection switching in a network that uses virtual connections.

SUMMARY

The above mentioned problems with protection switching in a telecommunications system and other problems are addressed by the present invention. A circuit and method for protection switching at the data link layer is described which separately tracks the status of virtual connections at a network element to detect and switch from a working route to a protection route for a virtual connection when an error is detected that affects the working route for that virtual connection.

In particular, an illustrative embodiment of the present invention includes a method for protection switching in a ring network having first and second routes for transporting cells using virtual connections. For each virtual connection, one route is the working route and the other route is the protection route. The method detects an error in one of the first and second routes. Further, the method generates error cells for each virtual connection in the ring network that is affected by the detected error. Error cells are injected to be transmitted down stream on the route in which the error was detected. A down stream network element receives the error cells. The down stream network element further tracks the status of the first and second routes for each virtual connection in the ring network based on the error cells. When an error is detected in a working route for a virtual connection, the method provides for switching to the protection route for that virtual connection. In one embodiment, generating error cells includes identifying a set of virtual connections that are affected by the detected error and generating an error cell for each virtual connection in the set. In another embodiment, identifying a set of virtual connections includes identifying virtual connections that are continued by a network element that detects the error.

In another embodiment, a ring network is provided. The ring network includes a number of network elements. Further, the ring network includes a number of ring segments that are coupled between adjacent network elements. These ring segments form first and second routes for transporting cells around the ring network using virtual connections. For each virtual connection, one route is the working route and the other route is the projection route. Each network element separately tracks the status of a number of virtual connections on each route such that when an error is detected in the working route of a virtual connection, the network element switches to the protection route for the virtual connection.

In another embodiment, a network element for a ring network having first and second routes for transporting cells using virtual connections is provided. For each virtual connection, one route is the working route and the other route is the protection route. The network element includes a first ring interface module that is coupled to the first route. Further, the network element includes a second ring interface module that is coupled to the second route. An access interface module includes first and second switch fabrics that are coupled to the first and second ring interface modules, respectively. The ring interface module generates error cells when an error is detected on the route associated with the ring interface module that affects one or more of the virtual connections transmitted on the route. Further, the access interface module tracks the state of the virtual connection such that when an error cell is received by a switch fabric which is associated with a working route for a virtual connection, the access interface module switches the other switching fabric to be the working route for the virtual connection.

DETAILED DESCRIPTION

In the following detailed description of the preferred embodiments, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
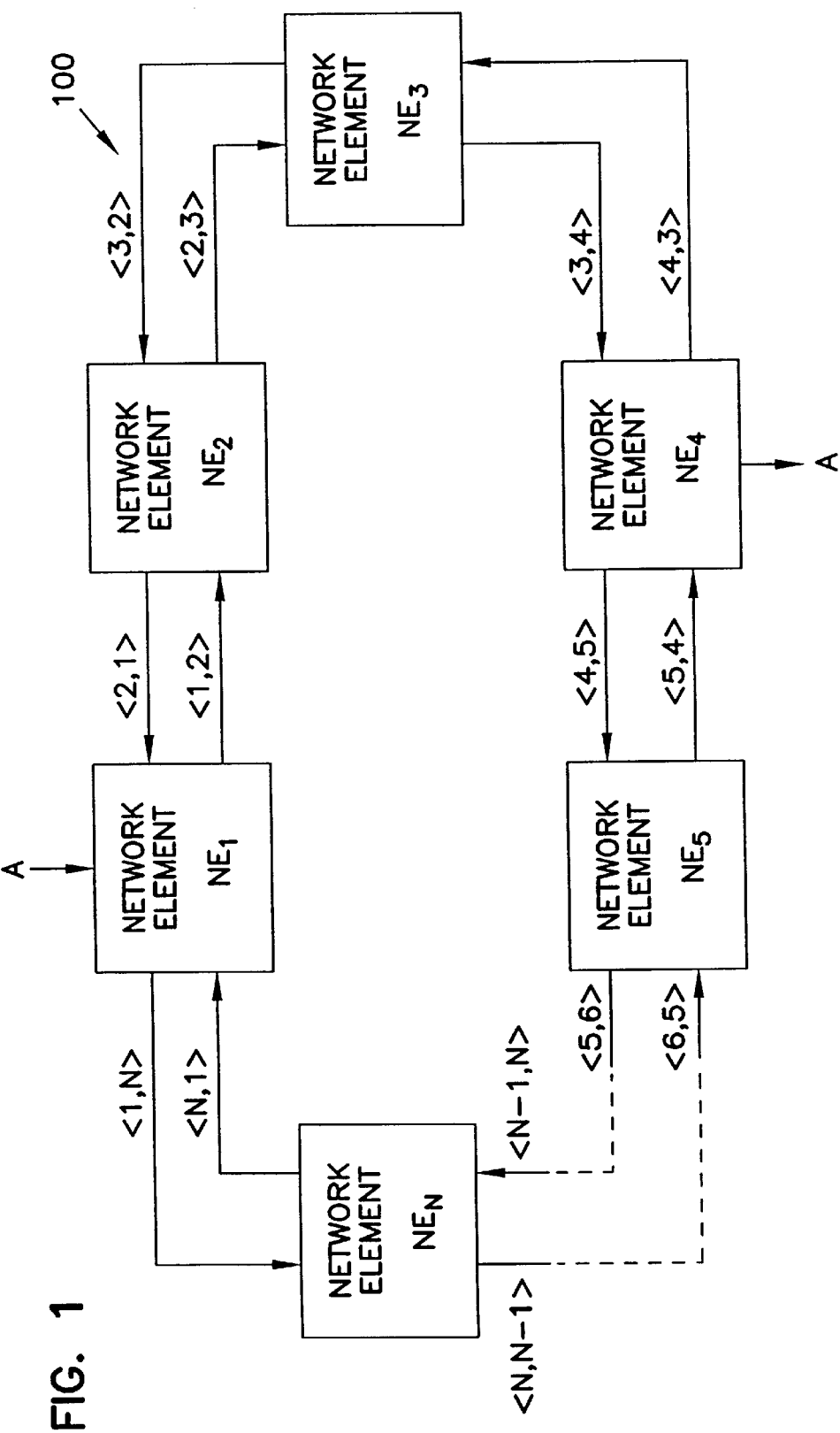
FIG. 1 is a block diagram of a virtual connection ring network constructed according to the teachings of the present invention.

FIG. 1 is a block diagram of an illustrative embodiment of the present invention. Network 100 is a closed-loop, ring network including network elements $NE_1$ through $NE_N$. Network 100 transmits packets between endpoints, e.g., terminals, over virtual connections using, for example, asynchronous transfer mode (ATM), frame relay, or any other appropriate virtual connection protocol. Network elements $NE_1$ through $NE_N$ may comprise, for example, virtual connection add/drop multiplexers that operate on the packets. In the embodiments, the network performs protection switching for the virtual connections at the ATM layer. This layer conventionally uses fixed length packets or cells. It is understood, however, that the embodiments of the present invention can transmit fixed or variable-length packets at the data link layer or higher protocol layers.

Network 100 comprises a number of "ring segments." A ring segment is defined as a link that carries data packets or cells in a unidirectional path between two adjacent network elements. Each ring segment in FIG. 1 is denoted by the expression <first network element, second network element> wherein the first network element and the second network element are adjacent network elements in network 100 in the direction of traffic flow around the network. For example, the ring segment connecting network element $NE_1$ to network element $NE_2$ is denoted <1,2>.

Communication over network 100 is accomplished through virtual connections between "endpoints." Each virtual connection begins with a "traffic originating endpoint" and terminates at a "traffic terminating endpoint." The traffic originating endpoint adds traffic or data packets onto network 100 and the traffic terminating endpoint drops the traffic from network 100. There can be many traffic originating endpoints on each network element of ring network 100. It is also noted that each network element supports multiple traffic terminating endpoints.

Network 100 is configured with ring segments that form two routes for transmitting packets or data cells around the ring between endpoints. Advantageously, each virtual connection transmits cells between endpoints on both routes around the ring. In one embodiment, the network elements are configured to transmit cells in opposite directions around the ring. By transmitting cells on both routes, network 100 can carry traffic even when there is an error in one of the routes.

To avoid confusion at the traffic terminating endpoint, one route is the "working route" and the other route is the "protection route" for the virtual connection between the endpoints. Normally, a traffic terminating endpoint receives the packets that are transmitted over the working route for the virtual connection. When an error that affects the working route for a virtual connection occurs, the appropriate network element switches the virtual connection to the protection route and provides data packets from the protection route to the traffic terminating endpoint for the virtual connection. It is noted that during normal operation in this embodiment, traffic is bridged to both the working route and the protection route. This allows a network element associated with the terminating endpoint to perform a protection switch without communicating this to the network element associated with the originating endpoint.

In operation, network 100 switches between working and protection routes for virtual connection "A" when an error is detected in the working route. It is noted that virtual connection A is a bi-directional connection even though only one direction of the virtual connection is shown and described here. In the direction shown, virtual connection A of FIG. 1 originates at network element $NE_1$ and terminates at network element $NE_4$. In this example, assume that the clockwise route is designated as the working route. Virtual connection A places cells on both routes. Network element $NE_1$ transmits cells on ring segment <1,N> of the protection route to network element $NE_N$. These cells continue around network 100 and terminate at network element $NE_4$. Virtual connection A also transmits the same cells on the working route to network element $NE_2$ on ring segment <1,2>. These cells continue clockwise around network 100 and terminate at network element $NE_4$.

At some point during transmission of cells for virtual connection A, an error, e.g., due to a cut cable in ring segment <2,3>, is detected by network element $NE_3$. Network element $NE_3$ identifies the virtual connections, including virtual connection A, that are affected by the error. Typically, these are the connections that are "continued"/ "passed through" or "dropped" at network element $NE_3$. Network element $NE_3$ generates and transmits cells, referred to as "error cells," downstream or locally (within this network element) in these virtual connections on the affected route. In this example, the error cells for virtual connection A are initially transmitted on ring segment <3,4> of the clockwise, working route. Network element $NE_4$ receives the error cells on the working route for virtual connection A. Network element $NE_4$ then switches to the protection route for virtual connection A. Thus, communication is maintained for virtual connection A despite the error in the working route.

Figure 2:
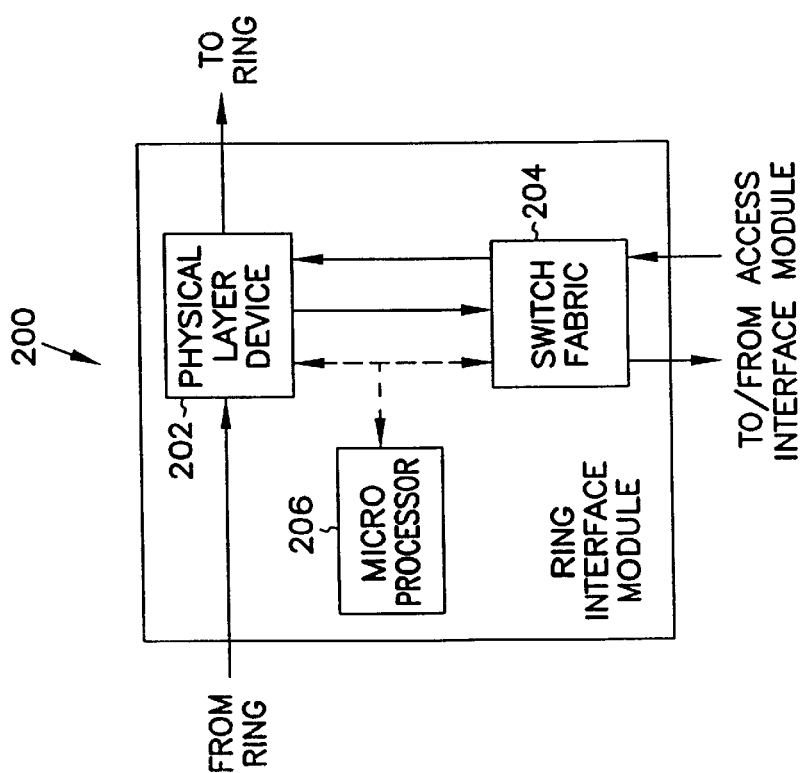
FIG. 2 is a block diagram of a ring interface module for a network element in a virtual connection ring network according to the teachings of the present invention.

FIG. 2 is a block diagram of a ring interface module, indicated generally at 200, that is constructed according to the teachings of the present invention. Ring interface module 200 is used, for example, in a network element in a ring network of the type shown and described with respect to FIG. 1, above, to interface with one of the routes of the ring network.

Among other functions, ring interface module 200 generates error cells when an error is detected in the route of the network. Ring interface module 200 includes physical layer device 202 that is coupled to receive a transmission stream from a ring segment of the ring network. Further, physical layer device 202 is also coupled to output a transmission stream to another ring segment of the ring network. Thus, physical layer device 202 interfaces the network element with the ring network at the physical layer. For purposes of this specification, a physical layer device interfaces a transmission stream between a line and a cell based protocol. The physical layer device has two sides. On one side, the physical layer device processes a physical layer, or part thereof, on a transmission stream leading to a line (wire or fiber). On the other side, the physical layer device presents a cell-based protocol to another entity/device which performs processing on the same stream—without the physical layer header—but at the higher layer, e.g., ATM layer. The physical layer device can work in the receive direction (line-to-cell), the transmit direction (cell-to-line), or both.

Ring interface module 200 also includes switch fabric 204. Switch fabric 204 is coupled to physical layer device 202—it interfaces the network element with the ring network at the data link or ATM layer. Switch fabric 204 is used to convey packets from the ring either back to the ring ("pass through" or "continue" the packets) or to endpoints associated with the network element ("dropped packets"). Switch fabric 204 also receives packets from endpoints associated with the network element. These packets are received from an access interface module, for example, of the type described below with respect to FIG. 3.

Switch fabric 204 includes a routing table. The routing table is used to route cells that are received by switch fabric 204 based on the virtual path identifier in the cell's header. For a cell received from the ring, the basic routing choices are: continue the cell by routing the cell back out onto the ring or dropping the cell by passing the cell out of the ring interface module to the switching equipment of the access interface module. Additionally, switch fabric 204 passes cells received from the access interface module out onto the ring through physical layer device 202.

Ring interface module 200 also includes microprocessor 206. Microprocessor 206 is coupled to provide control signals to physical layer device 202 and switch fabric 204.

In operation, microprocessor 206 executes instructions to cause ring interface module 200 to generate error cells when physical layer device 202 detects and reports an error to microprocessor 206. The error cells alert downstream network elements to the error and allow these network elements to determine when to switch from a working route to a protection route for a particular virtual connection.

Physical layer device 202 can detect many kinds of errors. For example, physical layer device 202 can detect a signal failure in the ring segment coupled to the input of physical layer device 202 due to, for example, a cut or damaged fiber optic cable. Further, physical layer device 202 can detect and report other errors that may be used to determine whether a particular virtual connection needs to switch from a working route to a protection route. Such other errors include but are not limited to signal degradation on the ring segment that is coupled to the input of physical layer device 202. It is noted that the error cells can be configured with one or more bits to include information concerning the type of error detected.

When an error is detected, microprocessor 206 generates a control signal for switch fabric 204. The control signal configures an error cell generator of switch fabric 204 to generate error cells for a specified set of the virtual connections supported by the ring network. In one embodiment, microprocessor 206 identifies the set of virtual connections by looking in a table. For example, microprocessor 206 can generate a control signal that instructs switch fabric 204 to generate error cells for each virtual connection that is continued by the ring interface module 200, i.e., the ring interface module receives cells from the ring and transmits the same cells back out onto the ring for transmission to a downstream network element. Alternatively, microprocessor 206 can generate a control signal that instructs the switch fabric to generate error cells for each virtual connection that is added to the ring network by ring interface module 200. Further, microprocessor 206 can instruct the switch fabric to generate error cells for some combination of virtual connections that are continued or added by ring interface module 200.

Advantageously, a single-byte write operation by microprocessor 206 can be used to specify the set of virtual connections in the cases, such as, when the subset is "all continued connections," "all added connections" or "all dropped connections." Based on this single-byte, switch fabric 204 generates and transmits error cells for each virtual connection in the subset.

Ring interface module 200 also accounts for arbitration between error cells and cells that carry traffic between endpoints. When an error is detected, a large number of virtual connections could be affected. Thus, switch fabric 204 could be called on to process a large burst of error cells. These error cells could interfere with normal cells that arrive at the switch fabric. In order to avoid delay in the flow of normal traffic, switch fabric 204 arbitrates between error cells for one set of virtual connections, e.g., all continuing virtual connections, and valid traffic on the remaining virtual connections, e.g., all added virtual connections. In one embodiment, switch fabric 204 arbitrates between error cells and normal cells in the same manner as for normal, fault-free operation between valid traffic for one set of virtual connections and valid traffic for other sets.

Ring interface module 200 can also notify the local access interface modules (those access interface modules in the same network element as ring interface module 200) of errors detected by physical layer device 202. First, microprocessor 206 sends signals to switch fabric 204 to generate error cells for all dropped connections. Alternatively, microprocessor 206 causes switch fabric 204 to indicate a "Ring Fault" over the bus of the network element that is associated with ring interface module 200. The response of an access module to these events is described below with respect to FIG. 3.

Figure 3:
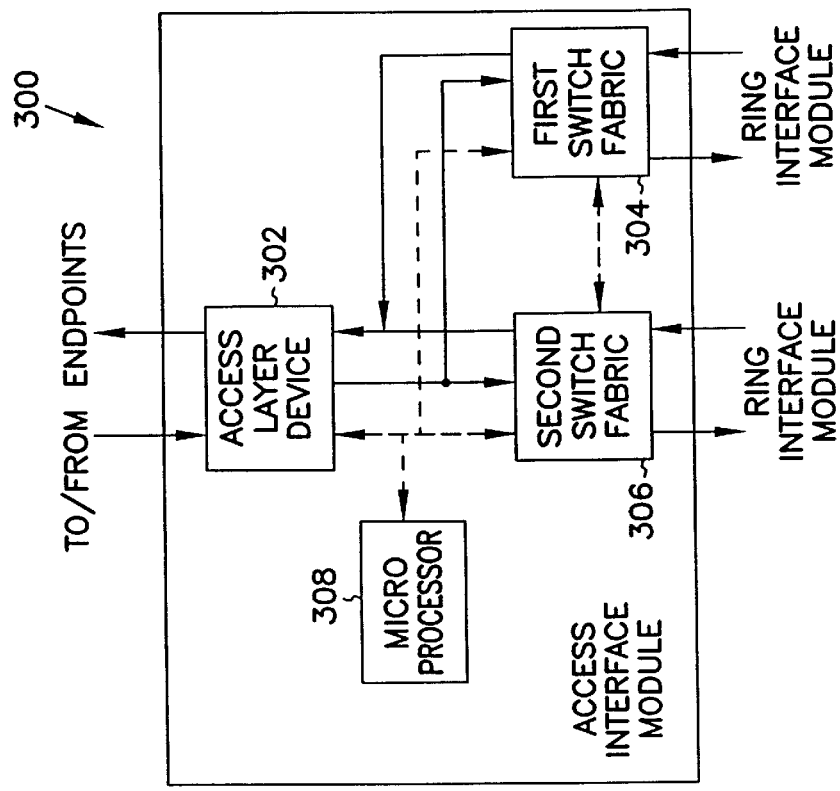
FIG. 3 is a block diagram of an access interface module for a network element in a virtual connection ring network according to the teachings of the present invention.

FIG. 3 is a block diagram of an access interface module, indicated generally at 300, and constructed according to the teachings of the present invention. Access interface module 300 is used, for example, in a network element in a ring network of the type shown and described with respect to FIG. 1, above. Among other functions, access interface module 300 determines when to switch from a working route to a protection route for a particular virtual connection when error cells are detected on the working route for the virtual connection. Access interface module 300 includes first and second switch fabrics, 304 and 306, respectively. Switch fabrics 304 and 306 are coupled to ring interface modules that are associated with different routes of a ring network. Thus, first switch fabric 304 receives and transmits cells on a first route of the ring network and second switch fabric 306 receives and transmits cells on a second route of the ring network.

First and second switch fabrics 304 and 306 are coupled to access device 302. Access device 302 may comprise, an ATM device, Frame Relay device or physical layer device. An output of access device 302 is coupled to inputs of both first and second switch fabrics 304 and 306. Further, an input of access device 302 is coupled to outputs of both first and second switch fabrics 304 and 306. Microprocessor 308 is coupled to provide control signals to access device 302 and first and second switch fabrics 304 and 306. Switch fabrics 304 and 306 each include a status table that tracks the status of the virtual connections. This table is used to decide when to switch from a working route to a protection route for a particular virtual connection. For purposes of clarity, conventional circuits needed to complete access interface module 300 and ring interface module 200 are not shown. However, such additional details are within the knowledge of a person of ordinary skill in the art.

In operation, access interface module 300 transmits traffic between the ring network and endpoints associated with the network elements. In one direction, the "ingress direction," access interface module 300 transmits traffic from the endpoints onto both routes of the ring network. This is referred to as "1+1 operation." For a given virtual connection, one route is designated as the working route and the other route is the protection route. All cells received by access device 302 from the endpoints associated with access interface module 300 are provided to both first and second switch fabrics 304 and 306. Switch fabrics 304 and 306 transmit the cells onto both routes of the ring network.

In the other direction, the "egress direction," access interface module 300 processes traffic coming from both routes of the ring to be transmitted to the endpoints associated with the access interface module. Traffic from one of the routes of the ring network is provided, through a ring interface module, to first switch fabric 304 and traffic from the other route is coupled, through another ring interface module, to second switch fabric 306. Microprocessor 308 generates control signals for first and second switching fabrics 304 and 306 that select which switch fabric is used as the working route for a particular virtual connection. When a virtual connection is set-up and there are no error conditions with either route of the ring network, either route may be selected as the working route. The choice may depend on, for example, the different transmission distances around the ring or other appropriate factors.

When an error cell is detected on a working route for a virtual connection, the switch fabric for the working route interrupts microprocessor 308. Microprocessor 308 reads the status table in the switch fabric to determine the virtual connection that received the error cell. In one embodiment, microprocessor 308 reads the status table one byte at a time with each bit in the byte corresponding to a state of a designated virtual connection of the ring network. For example, the status table of the switch fabric contains one bit per virtual connection. Initially, all bits are set to "0," indicating that no errors have been detected on the route for the virtual connection. When an error is detected, the bit corresponding to the virtual connection is set to "0," and this bit is set back to "0" when a valid user data cell—as opposed to an error cell—is received for that virtual connection.

In other embodiments, the network element may extract more information about the error from the error cells. For example, if multiple bits are used to indicate one or a number of states, these bits may be extracted from each error cell and stored in the status table for each virtual connection so as to indicate different kinds of errors, e.g., signal failure, signal degradation. In other embodiments, microprocessor 308 may extract information from less than all of the processed error cells to determine the nature of the error for purposes other than protection switching. Thus, the information concerning the nature of the error can be extracted from one or more of the error cells received at a downstream network element.

If the error cell corresponds to a virtual connection that uses this route as the working route, microprocessor 308 instructs switch fabrics 304 and 306 to switch such that the protection route becomes the working route for the virtual connection. Advantageously, by using a status table to hold the state information for the virtual connections, access interface module 300 is able to hold the states of the virtual connections without losing information due to queue overflow as would happen if a typically sized operations, administration and maintenance (OAM) cell queue approach were used.

Alternatively, in one embodiment, switch fabrics 304 and 306 directly exchange state-transition information for virtual connections, without the need for microprocessor 308 to read status tables and instruct switch fabrics 304 and 306 to change their working/protection routes. In this embodiment, upon detecting a state-deterioration transition for a virtual connection—e.g., changing the state for a virtual connection from a '0' (error-free) to some non-zero value (errored)—the switch fabric detecting the transition passes the virtual connection identifier along with the new state to the other switch fabric. For example, if a state-deteriorization is detected by switch fabric 304, switch fabric 304 passes the virtual connection identifier A along with the new state to switch fabric 306. If the state of virtual connection A as stored in switch fabric 306 is better than the state of virtual connection A conveyed by switch fabric 304 in its request to switch fabric 306, in the next cell cycle switch fabric 306 responds directly to switch fabric 304 with a grant, in which case in the cell cycle following the grant switch fabric 306 changes its configuration to be the working device for virtual connection A in the egress direction and switch fabric 304 changes its configuration to be the protection device for virtual connection A in the egress direction. Advantageously, this is all done without the involvement of microprocessor 308, thus expediting the switch over procedure. Microprocessor 308 is still notified of the switch over, and can still read the switch fabric status tables.

If the state of virtual connection A as stored in switch fabric 306 is equal to or worse than the state of virtual connection A conveyed by switch fabric 304 in its request to switch fabric 306, in the next cell cycle switch fabric 306 responds directly to switch fabric 304 with a "no grant" message, in which case neither switch fabric changes its working/protection configurations for virtual connection A. Microprocessor 308 is still notified of the state-deterioration transition of virtual connection A as detected by switch fabric 304, and can still read status tables of switch fabrics 304 and 306.

As described above with respect to FIG. 2, the ring interface module can notify a local access interface module of a detected error. When the local access interface module is notified of an error by error cells on a virtual connection, the access interface module uses the protection switching techniques described above to switch, when necessary, for a particular virtual connection. When the access interface module is notified of the error over a bus of the network element, the detecting switch fabric interrupts the microprocessor, which sets globally the other switch fabric as the working switch fabric (for all virtual connections for this access interface module). This is only for the egress direction. On the ingress side, traffic is still placed onto both routes of the ring. Further, a single byte override of the per-virtual connection routing table is provided to expedite switch over in this case.

Alternatively, in one embodiment switch fabrics 304 and 306 directly exchange global state-transition information and instructions for egress processing for all virtual connections for this access interface module, without the need for microprocessor 308 to set one switch fabric to globally be the working switch fabric for all virtual connections for this access interface module in the egress direction and the other switch fabric to globally be the protection switch fabric for all virtual connections for this access interface module in the egress direction.

In this embodiment, upon detecting a "Ring Fault" indication over a bus of the network element, the switch fabric that detects the indication passes this information to the other switch fabric. For example, when switch fabric 304 detects a Ring Fault, switch fabric 304 passes this information to switch fabric 306. If switch fabric 306 is not detecting a "Ring Fault" indication on its bus and it is not configured to globally be either the working switch fabric or the protection switch fabric for all virtual connections for this access interface module, in the next cell cycle switch fabric 306 responds directly to switch fabric 304 with a global grant for the egress direction. In the cell cycle after the global grant switch fabric 306 configures itself to globally be the working switch fabric for all virtual connections for this access interface module in the egress direction. Contemporaneously, switch fabric 304 configures itself to globally be the protection switch fabric for all virtual connections for this access interface module in the egress direction. On the ingress side, traffic is still placed onto both routes of the ring.

Advantageously, this is all done without the involvement of microprocessor 308, thus expediting the switch over procedure. Microprocessor 308 is still notified of the switch over.

If switch fabric 306 is detecting a "Ring Fault" indication on its bus or it is configured by microprocessor 308 to globally be either the working switch fabric or the protection switch fabric for all virtual connections for this access interface module in the egress direction, in the next cell cycle switch fabric 306 responds directly to switch fabric 304 with a "no grant" message, in which case neither switch fabric 304 nor switch fabric 306 changes its global working/protection configurations. Microprocessor 308 is still notified of the detection of the "Ring Fault" indication by switch fabric 304.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the present invention is not limited to applications using asynchronous transfer mode. Other virtual circuit protocols can be used. Further, the size and arrangement of the table that tracks the status of the virtual connections can be adjusted to meet the requirements of a specific application. Further, a multiple-byte signal can be used to identify the set of virtual connections affected by an error.

What is claimed is:

1. A ring network, comprising:
   a number of network elements;
   a number of ring segments coupled between adjacent network elements to form first and second routes for transporting cells using virtual connections wherein, for each virtual connection, one route is a working route and the other route is a protection route; and
   wherein each network element separately tracks the status of a number of virtual connections on each route such that when an error is detected on the working route for a virtual connection, the network element switches to the protection route for the virtual connection;
   wherein each network element includes two ring interface modules having:
      a microprocessor;
      a physical layer device that detects errors on a route of the ring network and communicates the errors to the microprocessor; and
      a switch fabric, responsive to the microprocessor, that generates error cells for transmission to downstream network elements and this network element on affected virtual connections that use the route.

2. The ring network of claim 1, wherein the microprocessor executes instructions to identify a set of virtual connections that are affected by a detected error and to instruct the switch fabric to generate error cells for each of the virtual connections in the set.

3. The ring network of claim 1, wherein the a microprocessor executes instructions to look in a table to determine a set of virtual connections for which error cells are to be generated.

4. The ring network of claim 1, wherein the microprocessor executes instructions to generate a code signal that corresponds to a set of virtual connections that are affected by a detected error and to pass the code signal to the switch fabric so as to generate error cells.

5. The ring network of claim 1, wherein the switch fabric includes an error cell generator that generates error cells that include at least one bit to indicate one of a number of possible states of one of the first and second routes.

6. A ring network, comprising:
   a number of network elements;
   a number of ring segments coupled between adjacent network elements to form first and second routes for transporting cells using virtual connections wherein, for each virtual connection, one route is a working route and the other route is a protection route; and
   wherein each network element separately tracks the status of a number of virtual connections on each route such that when an error is detected on the working route for a virtual connection, the network element switches to the protection route for the virtual connection;
   wherein the network elements each include an access interface module having:
      first and second switch fabrics each coupled to one of the first and second routes of the ring network;
      wherein the first and second switch fabrics each include a table that tracks the state of a number of virtual connections; and
   a controller circuit, communicatively coupled to the first and second switch fabrics, that provides control signals that indicate which of the first and second switch fabrics provides the working route for each virtual connection.

7. The ring network of claim 6, wherein the controller circuit comprises a microprocessor that executes instructions to extract information from a switch fabric to determine which virtual connections have received error cells.

8. The ring network of claim 6, wherein the first and second switch fabrics each include a table that tracks the state of each virtual connection based on error cells and data cells received on the virtual connections.

9. The ring network of claim 6, wherein the controller circuit comprises a microprocessor coupled to the first and second switch fabrics that executes instructions to read a table in one of the first and second switch fabrics to determine when to switch to a protection route for a virtual connection that received an error cell.

10. A network element for a ring network having first and second routes for transporting cells using virtual connections wherein, for each virtual connection, one route is a working route and the other route is a protection route, the network element comprising:
   a first ring interface module that is coupled to the first route;
   a second ring interface module that is coupled to the second route;
   an access interface module having first and second switch fabrics that are coupled to the first and second ring interface modules, respectively;
   wherein the first and second ring interface modules generate error cells when an error is detected on the route associated with the ring interface module that affects one or more of the virtual connections transmitted on the route; and
   wherein the access interface module tracks the state of the virtual connections such that when an error cell is received by a switch fabric that is associated with a working route for a virtual connection, the access interface module switches the other switching fabric to be the working route for the virtual connection.

11. The network element of claim 10, wherein the first ring interface module includes:
   a microprocessor;
   a physical layer device that detects errors on a route of the ring network and communicate the errors to the microprocessor; and
   a switch fabric, responsive to the microprocessor, that generates error cells for transmission to downstream network elements on affected virtual connections that use the route.

12. The network element of claim 11, wherein the microprocessor executes instructions to identify a set of virtual connections that are affected by a detected error and to instruct the switch fabric to generate error cells for each of the virtual connections in the set.

13. The network element of claim 11, wherein the microprocessor executes instructions to look in a table to determine a set of virtual connections for which error cells are to be generated.

14. The network element of claim 11, wherein the microprocessor executes instructions to generate a code signal that corresponds to a set of virtual connections that are affected by a detected error and to pass the code signal to the switch fabric so as to generate error cells.

15. The network element of claim 11, wherein the switch fabric includes an error cell generator that generates error cells that include at least one bit to indicate one of a number of possible states of one of the first and second routes.

16. The network element of claim 10, wherein the access interface module comprises:
   first and second switch fabrics each coupled to one of the first and second routes of the ring network;
   wherein the first and second switch fabrics each include a table that tracks the state of a number of virtual connections; and a controller circuit, communicatively coupled to the first and second switch fabrics, that provides control signals that indicate which of the first and second switch fabrics provides the working route for each virtual connection.

17. The network elements of claim 16, wherein the controller circuit comprises a microprocessor coupled to the first and second switch fabrics that executes instructions to extract information from a switch fabric to determine which virtual connections have received error cells.

18. The network element of claim 16, wherein the first and second switch fabrics each include a table that tracks the state of each virtual connection based error cells and data cells received on the virtual connections.

19. The network element of claim 16, wherein the controller circuit comprises a microprocessor coupled to the first and second switch fabrics that execute instructions to read a table in one of the first and second switch fabrics to determine when to switch to a protection route for a virtual connection that received an error cell.

20. A method for protection switching in a ring network having first and second routes for transporting cells using virtual connections wherein, for each virtual connection, one route is a working route and the other route is a protection route, the method comprising:
   detecting an error in one of the first and second routes (the "errored route");
   generating error cells for each virtual connection that is affected by the detected error;
   injecting the error cells to be transmitted downstream on the errored route;
   receiving the error cells at a first switch fabric at a downstream network element associated with the errored route;
   communicating the change in state of the errored route to a second switch fabric of the downstream network element associated with the other of the first and second routes (the "other route"); and
   when the state of the errored route is worse than the state of the other route and the other route is configured as the protection route for a virtual connection, automatically configuring the second switch fabric to establish the other route to be the working route for the virtual connection.

21. The method of claim 20, wherein generating error cells comprises:
   identifying a set of virtual connections that are affected by the detected error; and
   generating an error cell for each virtual connection in the set.

22. The method of claim 21, wherein identifying a set of virtual connections comprises identifying virtual connections that are continued by a network element that detects the error.

23. The method of claim 21, wherein identifying a set of virtual connections comprises looking in a table of a network element that detected the error to determine a set of virtual connections that are affected by the detected error.

24. The method of claim 20, wherein generating error cells comprises:
   identifying a set of virtual connections that are affected by the detected error;
   generating a code signal that corresponds to the set of virtual connections;
   passing the code signal to a switch fabric of a network element that detected the error; and generating an error cell for each virtual connection based on the code signal.

25. The method of claim 20, and further comprising arbitrating contention between error cells and cells that carry traffic between endpoints.

26. The method of claim 20, and further comprising extracting information from at least one error cell at the downstream network element that received the error cell to determine the nature of the error.

27. The method of claim 20, wherein generating error cells comprises generating error cells that include at least one bit to indicate one of a number of possible states of the errored route.

28. The method of claim 20, and further comprising tracking a state of the first and second routes for each virtual connection by updating a table at the downstream network element.

29. The method of claim 20, wherein detecting an error comprises detecting a loss of signal.

30. The method of claim 20, wherein detecting an error comprises detecting degradation in signals transmitted along a route of the ring network.

31. A ring network, comprising:
 a number of network elements, each including first and second switch fabrics;
 a number of ring segments coupled between adjacent network elements to form first and second routes for transporting cells using virtual connections wherein, for each virtual connection, one route is a working route and the other route is a protection route;
 wherein the first and second switch fabrics of each network element are associated with one of the first and second routes; and
 wherein the first and second switch fabrics of each network element separately track the status of a number of virtual connections such that when an error is detected by one of the switch fabrics associated with a working route for a virtual connection, the switch fabric detecting the error communicates the change in state for the virtual connection to the other switch fabric to be used in a switching decision.

32. The ring network of claim 31, wherein the network elements each include two ring interface modules having:
 a microprocessor;
 a physical layer device that detects errors on a route of the ring network and communicates the errors to the microprocessor; and
 a switch fabric, responsive to the microprocessor, that generates error cells for transmission to downstream network elements and this network element on affected virtual connections that use the route.

33. The ring network of claim 32, wherein the microprocessor executes instructions to identify a set of virtual connections that are affected by a detected error and to instruct the switch fabric to generate error cells for each of the virtual connections in the set.

34. The ring network of claim 32, wherein the a microprocessor executes instructions to look in a table to determine a set of virtual connections for which error cells are to be generated.

35. The ring network of claim 32, wherein the microprocessor executes instructions to generate a code signal that corresponds to a set of virtual connections that are affected by a detected error and to pass the code signal to the switch fabric so as to generate error cells.

36. The ring network of claim 32, wherein the switch fabric includes an error cell generator that generates error cells that include at least one bit to indicate one of a number of possible states of one of the first and second routes.

37. The ring network of claim 32, wherein the network elements each include an access interface module having:
 first and second switch fabrics each coupled to one of the first and second routes of the ring network; and
 wherein the first and second switch fabrics each include a table that tracks the state of a number of virtual connections.

38. The ring network of claim 37, wherein the first and second switch fabrics each include a table that tracks the state of each virtual connection based error cells and data cells received on the virtual connections.

39. A network element for a ring network having first and second routes for transporting cells using virtual connections wherein, for each virtual connection, one route is a working route and the other route is a protection route, the network element comprising:
 a first ring interface module that is coupled to the first route;
 a second ring interface module that is coupled to the second route;
 an access interface module having first and second switch fabrics that are coupled to the first and second ring interface modules, respectively;
 wherein the ring interface modules generate error cells when an error is detected on the route associated with the ring interface module that affects one or more of the virtual connections transmitted on the route; and
 wherein the first and second switch fabrics of the access interface module track the state of the virtual connections such that when an error cell is received by a switch fabric that is associated with a working route for a virtual connection, the switch fabric communicates the change in state of the virtual connection to the other switch fabric to be used in making a switching decision.

40. The network element of claim 39, wherein the first ring interface module includes:
 a microprocessor;
 a physical layer device that detects errors on a route of the ring network and communicate the errors to the microprocessor; and
 a switch fabric, responsive to the microprocessor, that generates error cells for transmission to downstream network elements on affected virtual connections that use the route.

41. The network element of claim 40, wherein the microprocessor executes instructions to identify a set of virtual connections that are affected by a detected error and to instruct the switch fabric to generate error cells for each of the virtual connections in the set.

42. The network element of claim 40, wherein the microprocessor executes instructions to look in a table to determine a set of virtual connections for which error cells are to be generated.

43. The network element of claim 40, wherein the microprocessor executes instructions to generate a code signal that corresponds to a set of virtual connections that are affected by a detected error and to pass the code signal to the switch fabric so as to generate error cells.

44. The network element of claim 40, wherein the switch fabric includes an error cell generator that generates error cells that include at least one bit to indicate one of a number of possible states of one of the first and second routes.

45. A method for protection switching in a ring network having first and second routes, the method comprising:

detecting an error condition on one of the first and second routes of a cell-based ring network (the "errored route") with a first switch fabric associated with the errored route;

communicating the detected ring fault to a second switch fabric; and when the second switch fabric has not detected an error condition on the other route and the second switch fabric is not established as the switch fabric for the working or protection route for all virtual connections that exit the ring at the network element, establishing the second switch fabric as the switch fabric for the working route for all virtual connections that exit the ring at the network element.

46. The method of claim 45, wherein detecting the error condition comprises detecting a ring fault on a bus of the network element associated with the errored route.

* * * * *

UNITED STATES PATENT AND TRADEMARK OFFICE
CERTIFICATE OF CORRECTION

PATENT NO.        : 6,859,430 B1                                Page 1 of 1
APPLICATION NO.   : 09/410402
DATED             : February 22, 2005
INVENTOR(S)       : Frank et al.

It is certified that error appears in the above-identified patent and that said Letters Patent is hereby corrected as shown below:

Title Pg., Item (56) "References Cited", insert each of the following references:

--4,527,270    07/1985    Sweeton--

--4,596,982    06/1986    Bahr et al.--

--4,704,713    11/1987    Haller et al.--

--4,763,315    08/1988    Nakayashiki et al.--

--5,712,968    01/1998    Nakayama et al.--

--5,760,934    06/1998    Sutter et al.--

--6,011,780    01/2000    Vaman et al.--

--6,233,221    05/2001    Lowe et al.--

--6,477,288    11/2002    Sato--

--6,657,952    12/2003    Shiragaki et al.--

--6,674,755    01/2004    Potter et al.--

Signed and Sealed this

Twenty-fifth Day of November, 2008

JON W. DUDAS
*Director of the United States Patent and Trademark Office*